United States Patent [19]

Lautenschläger, Jr.

[11] Patent Number: 4,752,143
[45] Date of Patent: Jun. 21, 1988

[54] DRAWER GUIDE

[75] Inventor: Karl Lautenschläger, Jr., Reinheim, Fed. Rep. of Germany

[73] Assignee: Karl Lautenschläger GmbH & Co. KG, Reinheim, Fed. Rep. of Germany

[21] Appl. No.: 72,858

[22] Filed: Jul. 14, 1987

[30] Foreign Application Priority Data

Jul. 14, 1986 [DE] Fed. Rep. of Germany ....... 3623743

[51] Int. Cl.$^4$ .................... A47B 88/00; A47B 88/14
[52] U.S. Cl. .................. 384/19; 312/341 R; 384/23
[58] Field of Search ............. 384/7, 19, 18, 23, 47, 384/48, 50, 51, 53, 55, 56; 312/341 R, 346, 347

[56] References Cited

U.S. PATENT DOCUMENTS

| 4,445,726 | 5/1984 | Röck et al. | 384/19 |
| 4,606,588 | 8/1986 | Koch | 312/341 R X |
| 4,653,821 | 3/1987 | Faust | 384/18 X |
| 4,659,237 | 4/1987 | Rapp | 384/19 |

FOREIGN PATENT DOCUMENTS 156520 12/1981 Japan ..................... 384/19
2061705 5/1981 United Kingdom ............ 312/341 R Primary Examiner—Stuart S. Levy
Assistant Examiner—Thomas R. Hannon

[57] ABSTRACT

A guide for drawers, cutting boards and other such retractable furniture parts, having a guide rail which can be fastened to a cabinet wall, and a running rail which can be fastened to the retractable furniture part and is mounted for movement along the guide rail with the interposition of rolling bearings held in a cage. The running rail is a hollow rail that is open on one side in a slot running in the direction of movement and has rolling-bearing tracks disposed in a triangle with one another in a cross section through their longitudinal central axes, one of the tracks being provided opposite the slot and the other two tracks being provided on opposite sides laterally of the slot, and the guide rail being provided on its end reaching through the slot into the interior of the running rail with three tracks which confront the tracks of the running rail in the same arrangement. At least in the interstice between the running rail track opposite the slot and the corresponding track of the guide rail, rollers are disposed with their central axes disposed transversely of the direction of the drawer movement.

2 Claims, 1 Drawing Sheet

U.S. Patent
Jun. 21, 1988
4,752,143
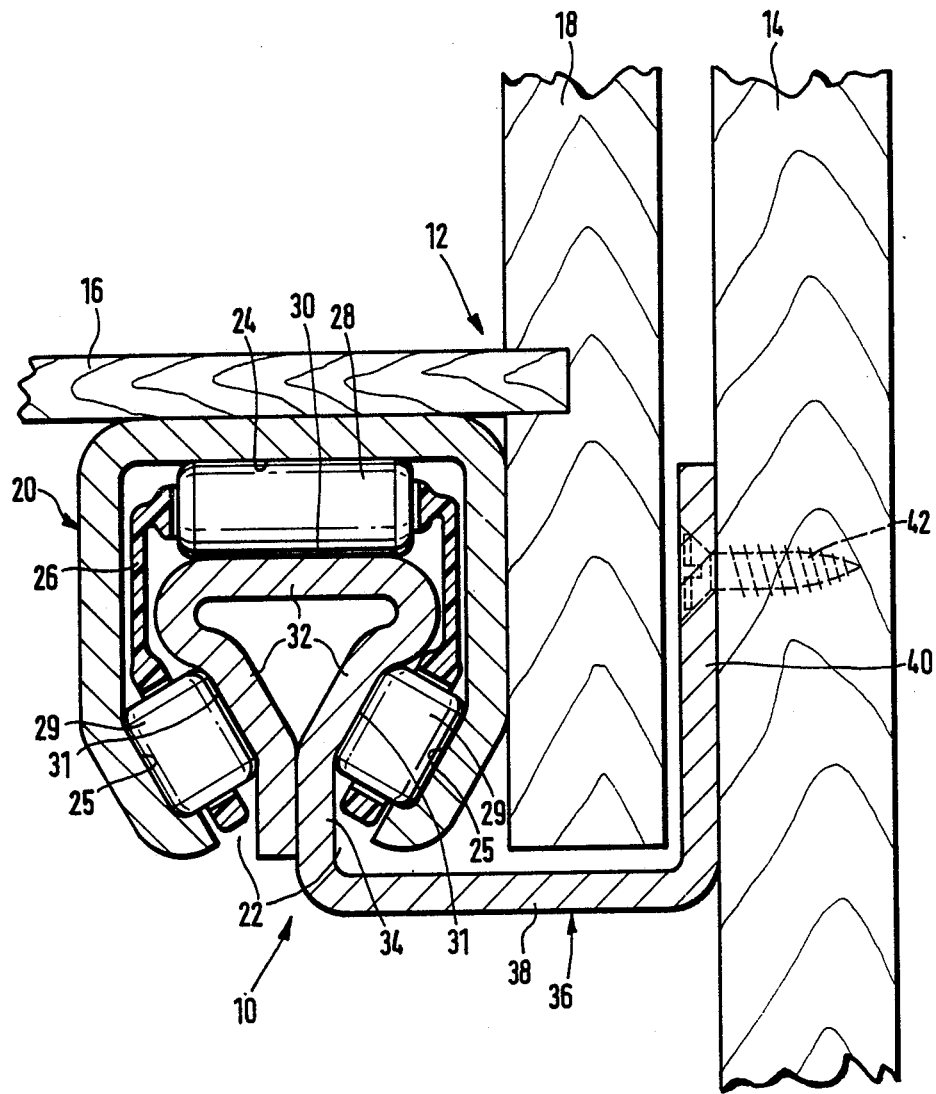

DRAWER GUIDE

BACKGROUND OF THE INVENTION

The invention relates to a guide for drawers, cutting boards and other such retractable furniture parts, having a guide rail which can be fastened to a cabinet wall, and a running rail which can be fastened to the retractable furniture part and is mounted for movement along the guide rail with the interposition of rolling bearings held in a cage. The running rail is a hollow rail that is open on one side in a slot running in the direction of movement and has rolling-bearing tracks disposed in a triangle with one another in cross section through their longitudinal central axes, one of the tracks being provided opposite the slot and the other two tracks being provided on opposite sides laterally of the slot, and the guide rail being provided on its end reaching through the slot into the interior of the running rail with three tracks which confront the tracks of the running rail in the same arrangement.

Such drawer guides provided with balls as the rolling bearings are known (DE-OS No. 31 27 701). Such ball-bearing drawer guides have proven to be basically functional, but their use on drawers of great weight or intended for heavy loads can be critical.

The invention is addressed to the problem of improving the known drawer guides such that, without substantial enlargement of their dimensions or increasing the number of rolling bodies, they will be usable even for heavily loaded cabinet drawers.

SUMMARY OF THE INVENTION

Setting out from a drawer guide of the kind mentioned above, this problem is solved according to the invention in that, at least in the interstice between the running rail track opposite the slot and the corresponding track of the guide rail, rollers are disposed with their central axes disposed transversely of the direction of the drawer movement. The transfer of the weight being carried on the running rail through the rollers provided according to the invention to the guide rail leads to a reduced specific surface loading of the rolling bodies on the tracks, in comparison with balls used as the rolling bodies, and thus to a better load carrying capacity.

In a desirable further development of the invention, the rolling bodies disposed in the interstice between the running rail tracks provided laterally alongside the slot in the running rail on the one hand and the associated tracks of the guide rail on the other are in the form of rollers, whose longitudinal central axes are also disposed transversely of the direction of movement and converge toward the slot. This brings it about that the thrust that is to be transmitted through the lateral rolling bodies to the guide rail with the drawer in the fully extended position likewise leads to a surface loading of these lateral rolling bodies which is reduced in comparison to plain ball-bearing drawer guides.

DETAILED DESCRIPTION OF PREFERRED EMBODIMENT

The invention will be further explained by describing an embodiment in conjunction with the drawing, which shows a cross section taken perpendicularly through the longitudinal axis of a drawer guide according to the invention, representing the arrangement of the drawer guide for use with a raised-bottom drawer.

The drawer guide represented in the FIGURE and identified as a whole by the number 10 serves for guiding along the wall of a cabinet a drawer 12, of which only the bottom corner area is represented. On the opposite side of the drawer, which is not shown, the components of a second drawer guide are to be considered as being of a basically identical but mirror-image configuration.

The drawer guide 10 has a running rail 20 disposed on the downwardly facing horizontal surface of the drawer bottom 16 and on the vertical inside surface of the portion of the side 18 of the drawer 12 projecting downward beyond the bottom 16. This running rail 20 is in the form of a channel having a substantially inverted U-shaped cross section, the bottom portion of whose flanges, however, are bent toward one another at an angle leaving a slot 22 between the edges of the channel. The inside surface of the web of the channel and the inside surface of the inwardly bent margins of the flanges form tracks 24 and 25 running in the direction of drawer movement, on which a plurality of cylindrical rollers 28 and 29, held rotatably at intervals from one another by a cage 26 of plastic, can roll with their central axes disposed perpendicular to the drawer movement direction and parallel with their associated tracks.

In their portions diametrically opposite the tracks 24 and 25, the cylindrical rollers 28 and 29 are supported on tracks 30 and 31, respectively, of an internal rail 32 of approximately triangular shape in cross section disposed centrally within the running rail 20, which is disposed on the edge of a limb 34 of a channel-like rail 36 representing the guide rail of the drawer guide 10, which can be fastened to the cabinet wall 14. The limb 34 reaches outwardly through the slot 22 in the running rail 20 and merges at an angle with the web 38 whose other margin merges with the second flange 40 of the rail 36, which is bent upwardly at a right angle, and which thus constitutes a flat mounting flange which can be attached by screws 42 to the wall 14.

In the drawing it can be seen that the rollers 28 supporting the weight of the closed drawer 12 and the weight of its contents on the guide rail 36 is spread out in comparison to the rollers 29 which are loaded when the drawer is opened, but on the other hand the latter are provided in twice the number. In comparison to drawer guides of similar construction using balls as the rolling bodies, the load-carrying capacity of the drawer guide 10 is therefore substantially increased.

Instead of the cylindrical rollers 28 and 29 used in the illustrated embodiment, rollers having a spherical contact surface can be used if the tracks 24 and 30, and 25 and 31, are made with a matching curved cross section. To keep the height of the running rail low, the rollers 28 might, on the other hand, also be replaced by so-called needle bearings, i.e., cylindrical rolling bodies having a very small diameter in proportion to their length. Lastly, it is also conceivable to use, instead of the cylindrical rollers 29, truncoconical rolling bodies, i.e., so-called taper rollers, in which case the tracks 25 and 31 must be disposed at an angle corresponding to the taper angle of the taper rollers.

I claim:

1. A guide for a drawer, cutting board or other retractable furniture part, comprising: a guide rail adapted to be fastened to a cabinet wall, and a running rail adapted to be fastened to the retractable furniture part and mounted for movement along the guide rail, rolling bearings held in a cage and interposed between said rails, said running rail being a hollow rail having a substantially inverted U-shaped cross section with flanges extending towards one another at an angle so as to leave a slot between opposed edges of the flanges, said slot running in the direction of movement of the running rail, said running rail having rolling bearing tracks disposed in a triangle with respect to one another in cross section through longitudinal central axes of said tracks, one of the tracks being arranged opposite said slot, and the other two tracks being located on opposite sides laterally of the slot, said guide rail having an end extending through the slot into the hollow running rail, said end having three tracks which respectively confront the tracks of the running rail, with a space therebetween, at least in the space between the track of the running rail opposite the slot and the corresponding track of the guide rail, said rolling bearings having rollers which have central axes disposed transversely of the direction of movement of the running rail.

2. A guide according to claim 1, wherein the rolling bearings disposed in the space between the running rail tracks provided laterally alongside the slot of the running rail and the tracks of the guide rail are rollers having longitudinal central axes also disposed transversely of the direction of movement of the running rail and converging toward the slot.

* * * * *